April 19, 1966     MIKLÓS NÓGRÁDI ET AL     3,246,570

AUTOMATIC PHOTOMECHANICAL EQUIPMENT FOR PREPARING SCULPTURES

Filed Jan. 5, 1965     3 Sheets-Sheet 1

INVENTORS:
Miklós NÓGRÁDI
and
Zoltán NÓGRÁDI

BY Arthur O. Klein
ATTORNEY

April 19, 1966    MIKLÓS NÓGRÁDI ET AL    3,246,570
AUTOMATIC PHOTOMECHANICAL EQUIPMENT FOR PREPARING SCULPTURES
Filed Jan. 5, 1965                                    3 Sheets-Sheet 3

INVENTORS:
Miklós NÓGRÁDI
and
Zoltán NÓGRÁDI
BY
Arthur O. Klein
ATTORNEY

United States Patent Office 3,246,570
Patented Apr. 19, 1966

3,246,570
AUTOMATIC PHOTOMECHANICAL EQUIPMENT FOR PREPARING SCULPTURES
Miklós Nógrádi and Zoltán Nógrádi, Budapest, Hungary, assignors to Chernolimpex Magyar Vegyiáru Kulkereskedelmi Vállalat, Budapest, Hungary
Filed Jan. 5, 1965, Ser. No. 423,552
11 Claims. (Cl. 90—13.5)

Various attempts have been made for the semi-automatic preparation of conform sculptures of persons or objects. Sculptures prepared by mechanical methods involve substantially lower costs than those prepared manually. Hence, they lend themselves more readily for large-scale distribution and, in addition, are excellently suited for criminalistic purposes. The semi-automatic equipments so far suggested for this purpose, however, have the common drawback that their manipulation requires much practice as well as manual skill. For these reasons, such equipments were not extensively used, since their work is neither rapid enough nor free of errors and thus not economical.

The object of the present invention is to render sculpturing fully automatic, rapid and free of errors.

The equipment according to the invention consists, just like the known equipments, of two independent units, one of which makes a photographic picture of the object—the camera unit—while the other carves the sculpture. This latter is called the sculpturing unit.

The camera unit consists in a known manner in the following parts: a rotary chair for placing the object, a light source (projector) in front thereof, to illuminate one half of said object, means synchronising the intermittent (step by step) passage of the film with the intermittent rotation of the rotary chair. Up to now, these means were mechanical elements controlled by a common driving motor, whereby it was rather difficult and cumbersome to change the place of the camera in relation to the object.

In order to eliminate this disadvantage, the invention suggests to use two separate synchronous motors with a common commutator for driving the rotary chair and the camera, respectively.

The main constituents of the sculpturing unit of the automatic photomechanical sculpturing equipment according to the invention are as follows: An undercarriage movable to and fro on a frame in the form of a pair of guide rails; an upper carriage movable to and fro in a direction normal to the motion of said lower carriage; a projector arranged above the upper carriage and intermittently projecting the series of pictures made by the camera unit onto a receiving screen secured to the undercarriage; a photoelectrical member, for example a photocell, mounted, between the projector and the receiving screen, to the upper carriage and keeping the point of the sculpturing tool on the circumference of the sculpture to be carved out of a block of material; separate electromotors to drive the upper- and undercarriages, the block of material and the carving tool and to actuate the projector, respectively, switches and contacts controlled by the displacements of said moving parts.

Further details of the invention are described below in connection with one illustrative embodiment of the equipment.

In the drawings said illustrative embodiment of the sculpturing equipment according to the invention is represented schematically. Those parts considered as nonessential for the understanding of the operation as well as some other parts which might impair clarity of the figures have been omitted.

Figure 5:
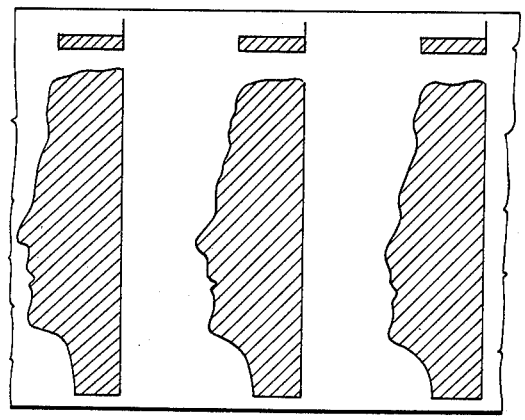
FIG. 5 shows three adjacent film frames.
Figure 1:
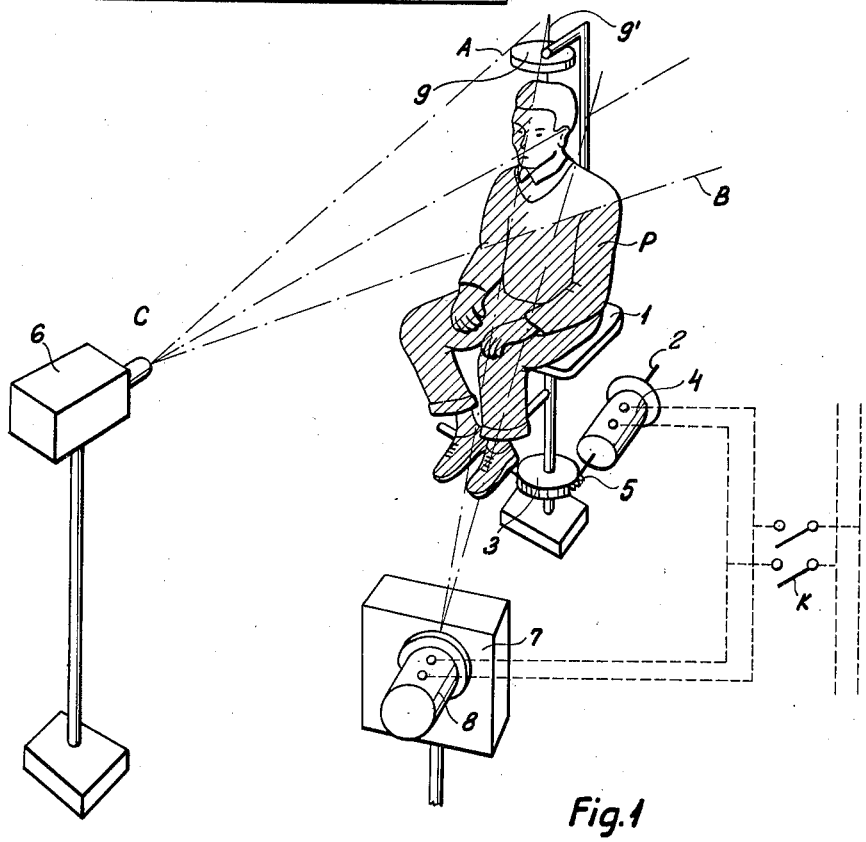
FIG. 1 is a perspective view of the camera unit.

In the example depicted the head of a man is to be portrayed in sculpture. The model person P (FIG. 1) sits on a rotary chair 1, arranged on the vertical shaft of which there is a worm wheel 3 meshing with a worm 5 secured to the shaft 2 of a synchronous motor 4. One half of the image field of the projector (light source) 6 arranged opposite the person P is screened. In this manner the head of the person is illuminated by that half of the light cone which falls onto the one side of the vertical plane ABC. The common circumference or border line of the illuminated and non-illuminated halves of the head are filmed by means of the camera, situated beside the projector 6. The camera is rotated by a synchronous motor 8. The synchronous motors 4 and 8 have a common commutator K in accordance with the invention. The number of the pictures taken during one full rotation of the rotary chair 1 is advantageously 200 to 360. The worm wheel 3 has the same number of teeth. The light cone also illuminates a disc 9, mounted on a column protruding upwards from the back of the rotary chair 1. The axis of the disc 9 coincides with the longitudinal center line of the person's neck. The border line here obtained will have importance in the sculpturing unit when adjusting the film. After the picture has been taken, the film—three consecutive frames of which may be seen in FIG. 5—are developed in the usual manner, whereby a series of sectional circumference lines of the head of the person P are obtained.

The sculpturing or carving unit is described hereinafter with reference to FIGS. 2–4. A tubular frame 10 is supported by a rack (not shown) standing on the floor. Two opposite longitudinal sides of the frame 10 constitute a pair of guiding rails on which an undercarriage 11 and thereabove an upper carriage 12 can be displaced on three rollers each. The undercarriage 11 moves in the direction of the axis of rotation of a block of material T from which the sculpture S is to be formed, whereas the upper carriage moves laterally, in a direction perpendicular to that of the undercarriage. The undercarriage 11 supports on its bottom side of a receiving screen 13, onto which the contour photographed on the film is projected by the projector. A shaft 15 is mounted in a fork 14 secured to the upper carriage 12, and supports a photocell or other photoelectric means 16 as well as an iron core 17. A screw spring 18 fitted onto the shaft 15 engages both the photocell 16 and the fork 14. The iron core 17 faces an electromagnet 19. An electromotor 20 together with the carving tool 21 mounted on its shaft is also secured to the upper carriage 12. The point of the carving tool 21 is situated under the photocell 16 in vertical alignment therewith. The upper carriage 12 also supports a half nut 22 which meshes with the screw spindle 23 mounted on the undercarriage 11. This screw spindle is driven by an electrometer 24 with the aid of belt and pulley. The motor 24 is of the rapidly reversible type. The reversal of the motor is controlled by the photocell 16 through a relay 25 electrically connected with it. The connection is not shown.

A shaft 27 supporting the block of material T is rotatably mounted in the stationary frame 10. A worm wheel 28 on the shaft 27 meshes with a worm 29, on the shaft of which a worm wheel 30 is keyed with a worm 32 of an electromotor 31. A disc 33 is also arranged on the worm shaft 26. The disc 33 has a notch cut in its circumference, with which the armature 34' of an electromagnet 34 may mesh under the action of a compression spring 35. A contact 36 secured to the other end of said electromagnet 34 may cooperate with a contact 37. A schematically represented amplifier 38 serves to amplify the current of the photocell 16 and is also secured to the frame 10, as well as a switchboard 39. An angle pulley 40 fulcrumed on the frame 10 supports a cable, on one end of which a counterweight 41 is suspended, the other end of said cable being fixed to the undercarriage 11.

Figure 2:
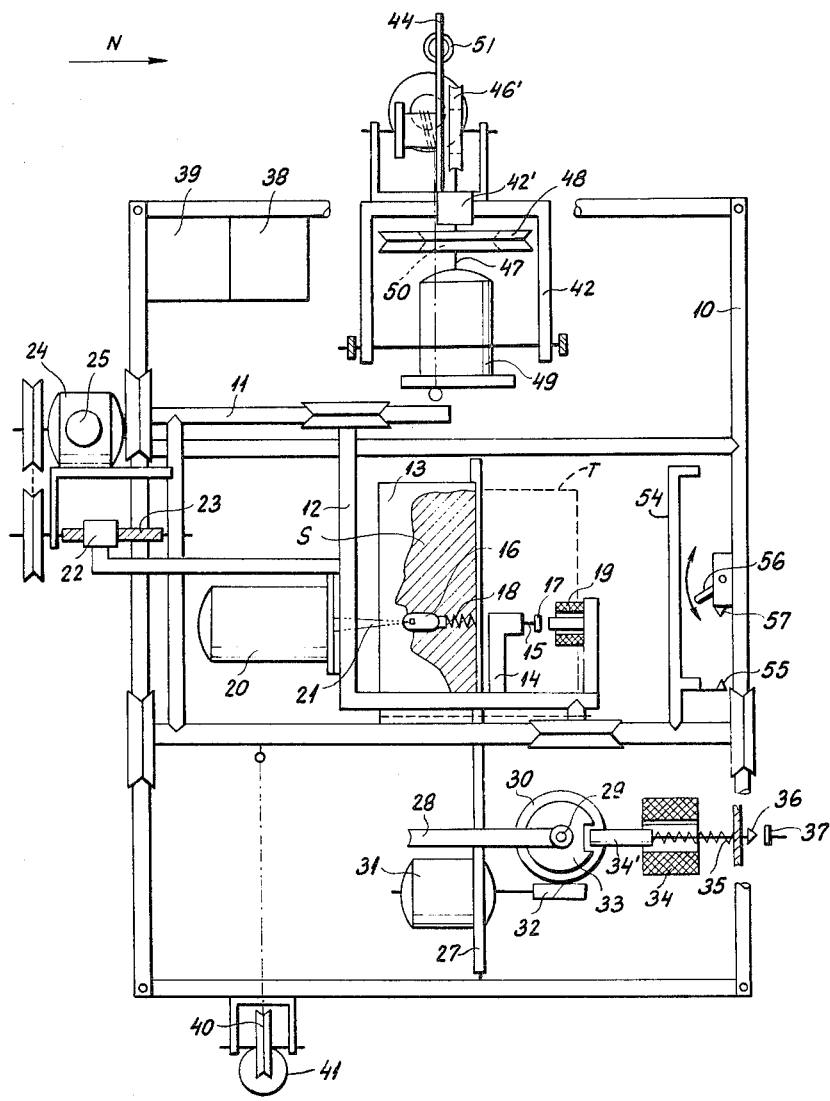
FIG. 2 is a top view of the sculpturing unit.
Figure 4:
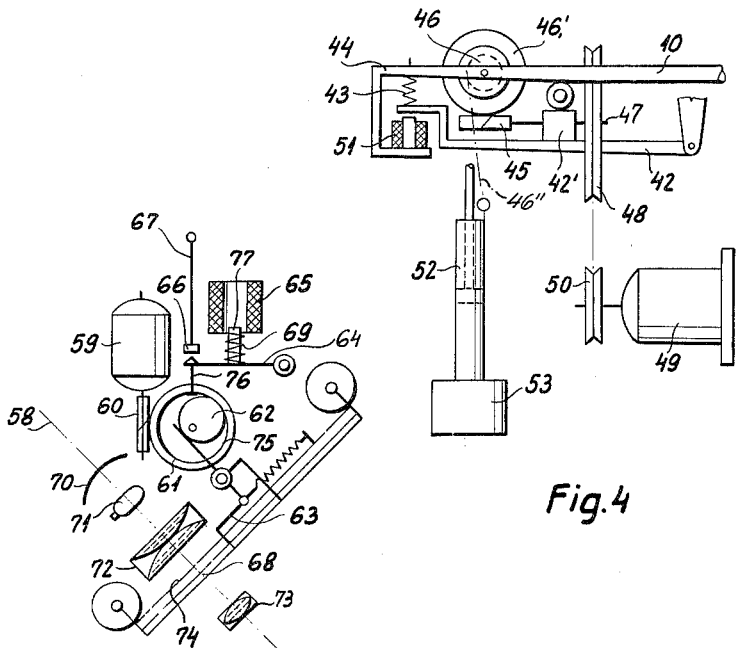
FIG. 4 is a side elevation of the longitudinally actuating mechanism, viewed in the direction of the arrow N of FIG. 2.
Figure 3:
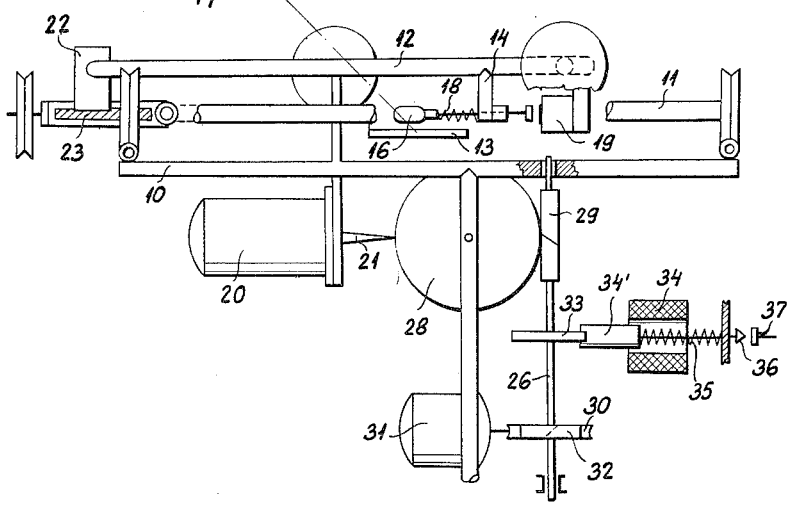
FIG. 3 is an elevation of the sculpturing unit.

The undercarriage 11 rolling on the frame 10 is operated by the following elements, shown in FIGS. 2 and 4. A tilting arm 42 mounted on the frame 10 is connected by a tension spring 43 with a supporting arm 44 also mounted on the frame 10. The shaft 47 of a worm 45 is mounted in a bearing 42' disposed on said arm 42 and the worm 45 meshes with a worm wheel 46' of a cable drum 46 having a wound cable 46. A belt pulley 48 on the shaft 47 of the worm 45 is driven by a belt pulley 50 of an electromotor 49 by means of a V-belt. The end of the supporting arm 44 is angularly bent and supports an electromagnet 51. The arm 44 also supports the piston of a brake cylinder 52 loaded by a counterweight 53. The free end of the wound cable 46 is fixed to the brake cylinder 52.

The undercarriage 11 also supports a limit switch arm 54 and a contact 55, and opposite to them there is mounted on a frame 10 a commutator switch 56 and a contact 57. The projector apparatus is secured to the chassis of the equipment and is arranged above the receiving screen 13 (FIG. 3). The optical arrangement 58 consists of a collector mirror 70, a light source 71, a collector lens 72 and an object lens 73. The film 74 taken in the camera unit according to FIG. 1 travels intermittently above a gate 68 between said elements 72 and 73. A worm wheel 61 is driven by means of an electromotor 59 through worm 60. The shaft of the worm wheel 61 also supports a disc 75 which, similarly to the disc 33, has a notch cut on its circumference, as well as an eccentric 62. This latter actuates a ratchet drive 63—known per se—to move the film. The free end of a one-armed tilting lever 64 carries a tongue 76 meshing with the notch of a disc 75, and a contact 66, which cooperates with a stationary contact 67. The armature 77 of an electromagnet 65 is provided in the center of the tilting lever 64. The armature is surrounded by a compression spring 69 one end of which engages the electromagnet 65 and the other the tilting arm 64.

The sculpturing equipment operates as follows:

The first film-frame is so projected on the receiving screen 13 that the shaft 9' of the disc 9 of the rotary chair 1 (FIG. 1), which is visible on every frame (FIG. 5) should coincide with the axis of rotation 27 of the block of material T (FIG. 2). The edge of the shadow visible on the image of the disc 9 facilitates to sharply adjust the contour of the sculpture. The motor 24 operating the upper carriage 12 is now started. At the same time, the photocell 16 receives light from a light source 71 through the optical arrangement 58 and the gate 68 (FIG. 3), whereupon an electrical current is generated and then amplified in the amplifier 38 (FIG. 2). The circuit becomes closed through relay 25, whereby the motor 24 makes a revolution in such a sense that the upper carriage 12 together with the photocell 16 is displaced and the opening of the photocell enters the shadowed side of the contour of sculpture. At this moment the relay 25 reverses the sense of rotation of the motor 24, so that the carriage is shifted in opposite direction and the opening of the photocell gets back into the illuminated area. The motor is now again reversing. Due to the frequent repetition of this play the opening of the photocell vibrates across the border line of the contour, i.e., it can only move along the outline, when the undercarriage is being moved.

The vibration of the photocell may be considerably accelerated by securing a shaft 15 ending in an iron core 17 to the photocell. The iron core is pulled in against the action of spring 18 by the electromagnet 19 controlled by relay 25, and is again released when the motor is reversing. When the vibration is thus accelerated, the contour is followed with increased accuracy. During one stroke of the undercarriage 11 and the carving tool 21 driven by the motor 20 carves off part of the block T between two extreme points of the contour of the sculpture S.

The undercarriage 11 is moved by the motor 49 reeling the cable which is fixed to the undercarriage 11 and wound on the cable drum 46, with the agency of cable pulleys 48, 50, worm 45 and the worm wheel of the cable drum 46, around this drum. The engagement of the worm with the worm wheel is realised in such a manner that the worm 45 mounted in the bearing 42' secured to the tilting arm 42 is pressed to the worm wheel 46 by means of the spring 43 (FIG. 4). In the top limit position of the undercarriage 11 the commutator 56 is tilted by the limit switch arm 54 (FIG. 2), whereby the circuit of the electromagnet 51 is closed (FIG. 4), so that the magnet draws the tilting arm 42 away from the cable drum 46 against the action of the spring 43, the cable drum 46 is released and the counterweight 41 (FIG. 2) pulls the undercarriage 11 by means of the cable passing over the guide roller 40 into the lower limit position. The brake cylinder 52 makes this motion uniform (free of acceleration). In the lower limit position the limit switching arm 54 which cooperates with the undercarriage 11 tilts the commutator 56. Thereby the circuit of the electromagnet 51 is interrupted (FIG 4), the worm 45 engages the worm wheel 46 due to the action of the spring 43, and the undercarriage 11 again moves upwards.

In the top dead point of the undercarriage the circuits of the motors 59 and 31, respectively, of the projector and the shaft of the sculpture are simultaneously closed by the contacts 55 and 57. During the downward stroke of the undercarriage 11, when the tool 21 does not operate, the film is passed on and the axis of the sculpture is rotated by these motors. The film is passed on intermittently by the motor 59. To this end, the eccentric 62 has to make one rotataion in order to actuate the ratchet drive 63 leaning against it for hooking into the film. When the circuit of the electromagnet 65 is closed, the latter pulls the tongue 76 of the contact 64 secured to the armature 77, out of the circumferential notch of the disc 75 against the action of the compression spring 69. Owing to the displacement of the armature, the contacts 66 and 67 are simultaneously closed and switch the motor 59 on. During one rotation of the disc 75, spring 69 presses the tilting lever 64 to the circumference of disc 75 and in this manner the motor is kept on. When later the circumferential notch of the disc faces the tongue 76, the latter meshes with the notch whereby the rotation of the disc is stopped. At the same time the contacts 66 and 67 separate, interrupting the circuit of motor 59.

Simultaneously with the change of frame of the film, the shaft 27 of the block of material T (FIG. 2) must be turned by one pitch. When the undercarriage 11 gets into the top position, the contact 55 cooperating with contact 57 closes the circuit of the electromagnet 34, whereby the electromagnet draws the armature 34', so far meshing with the circumferential notch of the disc 33, out of this notch, against the action of the compression spring 35. Due to the displacement of the armature 34' the contacts 36, 37 are closed and switch the motor 31 on. During one rotation of the disc 33, the armature is pressed to the circumference of the disc by the compression spring 35, and the motor is kept going. When the circumferential notch of the disc 33 faces the armature 34', the end of the latter jumps into the notch and stops the rotation of the worm wheel 29, because the contacts 36, 37 separate, and interrupt the circuit of motor 31. Thereafter the carving procedure referred to above is repeated along the re-set contour of the sculpture.

It is possible to calculate the length of time required for completing the entire sculpture and there is no need for attendance during that time. Acoustical or optical signals known per se may indicate the completion of the procedure.

Although our invention has been illustrated and described with reference to the preferred embodiments thereof, we wish to have it understood that it is in no way limited to the details of such embodiments but is capable of numerous modifications within the scope of the appended claims.

What we claim is:

1. Automatic photomechanical equipment for preparing a sculpture out of a block of material and comprising a photographic camera unit and a sculpturing unit, said camera unit being driven by a first synchronous motor and is operatively connected a rotatable object holder which is also driven by a second synchronous motor, a projector apparatus mounted opposite said object holder, characterized by having a common commutator for said second synchronous driving motor which is connected to said object holder and for said first synchronous driving motor which is connected to said camera unit, the main constituent parts of the sculpturing unit being the following: an undercarriage mounted and movable on a frame comprising a pair of guiding rails; an upper carriage movable in a direction normal to the motion of said undercarriage; a motor driven carving tool operatively mounted on said upper carriage, said projector apparatus for intermittently projecting a series of images made by said camera unit onto a receiving screen being mounted on said undercarriage; photoelectric means operatively connected to said upper carriage for photoelectric controlling the motion of carving tool along the circumference of said sculpture to be prepared from said block of material; separate motors respectively operatively connected to the following driven parts: to said undercarriage for shifting the same, and to said upper carriage, and also being operatively connected to said block of material and said carving tool for rotating said block of material and said carving tool, and for operating said projector, respectively, and a plurality of electrical commutators, switches and contacts controlled by the displacements of said upper and under-carriages.

2. An automatic sculpturing device, comprising in combination, an automatic photographic camera unit for taking successively profile pictures of an object, said camera unit comprising rotatable supporting means for said object, photographic camera means for taking a plurality of successive pictures of said object, film advancing means operatively mounted in said camera means, a first motor operatively connected to said supporting means for rotating the same, a second motor operatively connected to said film advancing means, said first and second motors having common commutator means so that said first and second motors move synchronously with respect to each other, and an automatic sculpturing unit for automatically carving a block of material in conformance with said object, said sculpturing unit comprising a stationary frame, an undercarriage longitudinally movably mounted on said stationary frame, an upper carriage movably mounted on said undercarriage in a direction normal to the direction of movement of said undercarriage, a projection apparatus operatively mounted on said stationary frame and adapted to project successively images of said pictures taken by said photographic camera means, photoelectric cell means secured to said upper carriage and adapted to operatively move in and out of the light path of said projection apparatus, a block of material rotatably mounted in said stationary frame, a carving tool secured to said upper carriage and adapted to sculpture said block of material in conformance with the motion of said photoelectric cell means, third and fourth motor means respectively operatively connected to said projection apparatus and said block of material, switching means in said sculpturing device for simultaneously energizing said third and fourth motor means, thereby causing said projecting means to project a successive image of a picture of said plurality of pictures of said object, and causing said block of material to be turned a predetermined amount, and electric motor means operatively connected to said undercarriage, upper carriage, carving tool for respectively operating them.

3. In an automatic sculpturing device, an automatic photographic camera unit for taking successively a plurality of profile pictures of an object, comprising in combination, rotatable supporting means for said object, photographic camera means arranged opposite said rotatable supporting means for taking a series of successive pictures of said object, film advancing means operatively mounted in said camera means, a first motor operatively connected to said supporting means for rotating the same, a second motor operatively connected to said film advancing means, said first and second motors having common commutator means so that first and second motors move synchronously with respect to each other, and light projecting means arranged opposite said rotatable supporting means for illuminating said object.

4. In an automatic sculpturing device, an automatic sculpturing unit for carving a block of material in conformance with the shape of an object, comprising in combination, a stationary frame, and undercarriage longitudinally movably mounted on said stationary frame, an upper carriage movably mounted on said undercarriage in a direction normal to the direction of movement of said undercarriage, a projection apparatus operatively mounted on said stationary frame and adapted to project successively a series of images, photoelectric cell means secured to said upper carriage and adapted to operatively move in and out of the light path of said projection apparatus, a block of material rotatably mounted in said stationary frame, a carving tool secured to said upper carriage and adapted to sculpture said block of material in conformance with the motion of said photoelectric cell means, first and second motor means respectively operatively connnected to said projection apparatus and said block of material, electric switching means mounted in said sculpturing device and electrically connected to said first and second motor means for simultaneously energizing them, thereby causing said projection apparatus means to project a successive image of said series of images and causing said block of material to be rotated a predetermined amount by said second motor means, and electric motor means operatively connected to said undercarriage, upper carriage and carving tool for respectively operating them.

5. The automatic sculpturing unit as set forth in claim 2, including driving means operatively connecting said undercarriage to said electric motor means, said driving means comprising a cable pulley rotatably supported on said stationary frame, a cable wound on said pulley, one end of which is secured to said undercarriage and the other end of which is secured to a counterweight, a supporting member tiltably supported on said stationary frame and extending opposite to and immediately below said pulley, a worm gear rotatably mounted on said supporting member and adapted to mesh with said pulley, said worm gear being operatively connected to said electric motor means, an electro-magnet mounted on said stationary frame opposite said supporting member and adapted to selectively tilt said supporting member away from said frame thereby disengaging said worm gear and said pulley.

6. The automatic sculpturing unit as set forth in claim 4, including driving means operatively connecting said undercarriage to said electric motor means, said driving means comprising a cable pulley rotatably supported on said stationary frame, a cable wound on said pulley, one end of which is secured to said undercarriage and the other end of which is secured to a counterweight, a supporting member tiltably supported on said stationary frame and extending opposite to and immediately below said pulley, a worm gear rotatably mounted on said supporting member and adapted to mesh with said pulley, said worm gear being operatively connected to said electric motor means, an electro-magnet mounted on said stationary frame opposite said supporting member and adapted to selectively tilt said supporting supporting member away from said frame thereby disengaging said worm gear and said pulley.

7. The automatic sculpturing unit as set forth in claim 2, including driving means mounted on said undercarriage and operatively connected to said upper carriage, said driving means comprising a rapidly reversible electric motor mounted on said undercarriage, said rapidly reversible electric motor forming part of said electric motor means, a relay electrically connecting said photoelectric cell means to said rapidly reversible electric motor, a screw spindle rotatably mounted on said undercarriage and operatively connected to said rapidly reversible electric motor, said upper carriage including a member which meshes with said screw spindle.

8. The automatic sculpturing unit as set forth in claim 7, wherein said photoelectric cell means comprise a shaft made of ferromagnetic material, an electromagnet mounted on said upper carriage opposite said shaft and being electrically connected to said relay, and a spring operatively mounted on said shaft and biasing said upper carriage against the action of said electromagnet.

9. The automatic sculpturing unit as set forth in claim 2, wherein said fourth motor means is operatively connected to said block of material by means of speed reduction gear means, the latter comprising a disc rotatably mounted on said stationary frame, a gear wheel meshing with said disc and also rotatably supported in said stationary frame, cam means on said gear wheel, an electromagnet mounted on said stationary frame opposite said gear wheel, said electromagnet having an axially moving shaft portion adapted to engage said cam means when said electromagnet is excited.

10. The automatic sculpturing unit as set forth in claim 2, wherein said third motor is operatively connected to said projection apparatus by means of a step mechanism, the latter comprising reduction gear means operatively connected to said third motor, a first disc and a second eccentric disc rotatably supported in said reduction gear means, said first disc comprising a cam means, a film transport ratchet gear operatively mounted in said projection apparatus for stepwise advancing of a film on which said successive pictures of said object have been taken by said photographic camera means, an electromagnet having an extension adapted to mesh with said cam means, and means operatively connecting said second eccentric disc to said film transport ratchet gear, whereby the operation of said film transport ratchet gear is controlled by said electromagnet which selectively disengages said extension from said cam means thereby permitting rotation of said second eccentric disc and the selective operation of said film transport ratchet gear, said electromagnet being controlled by said switching means in said sculpturing device.

11. The automatic sculpturing device as set forth in claim 7, including an electric amplifier in the electric circuit between said photoelectric cell means and said relay.

References Cited by the Examiner

UNITED STATES PATENTS

| 1,382,978 | 6/1921 | Hopkins | 90—13.1 |
| 1,615,261 | 1/1927 | Edmunds | 90—13.1 |

FOREIGN PATENTS

| 254,791 | 7/1926 | Great Britain. |
| 102,999 | 1/1938 | Australia. |

WILLIAM W. DYER, Jr., *Primary Examiner.*

G. A. DOST, *Assistant Examiner.*